United States Patent [19]
Rayburn

[11] 3,906,614
[45] Sept. 23, 1975

[54] METHOD OF LOADING RADIAL LEAD COMPONENTS ON PLASTIC CARRIER

[75] Inventor: Charles C. Rayburn, Mount Prospect, Ill.

[73] Assignee: Illinois Tool Works Inc., Chicago, Ill.

[22] Filed: July 18, 1974

[21] Appl. No.: 489,777

[52] U.S. Cl. .................... 29/427; 29/626; 53/3; 53/167; 214/1 BB; 214/310
[51] Int. Cl.² .................... B23P 19/02; B65B 5/00
[58] Field of Search ............ 29/427, 429, 430, 450, 29/451, 626, 627; 53/3, 29, 167, 200; 214/1 BB, 310

[56] References Cited
UNITED STATES PATENTS

| | | | |
|---|---|---|---|
| 2,214,230 | 9/1940 | Freeburg | 206/65 |
| 2,746,079 | 5/1956 | Zell | 29/430 |
| 3,073,007 | 1/1963 | Rubinstein et al. | 29/25.42 |
| 3,079,957 | 5/1963 | Weiss | 140/71 |
| 3,165,868 | 1/1965 | MacDonald et al. | 53/200 X |
| 3,517,438 | 6/1970 | Johnson et al. | 29/627 |
| 3,535,780 | 10/1970 | Berger | 29/430 X |
| 3,724,068 | 4/1973 | Galli | 29/626 |

Primary Examiner—Donald R. Schran
Assistant Examiner—Leon Gilden
Attorney, Agent, or Firm—Robert W. Beart; Glenn W. Bowen

[57] ABSTRACT

A method of loading electrical components onto a plastic carrier is disclosed. Holes are punched into the plastic carrier strip, which may be rolled onto a drum; and the radial lead components are sequentially inserted into the holes. The plastic carrier strip and the components may then be loaded into a container and brought to a location where unloading of the carrier is achieved. The carrier is rolled from the drum as the drum rotates, and a guide wedge is used to lift the components out of the carrier as it is unrolled from the drum in a sequential manner for use.

10 Claims, 20 Drawing Figures

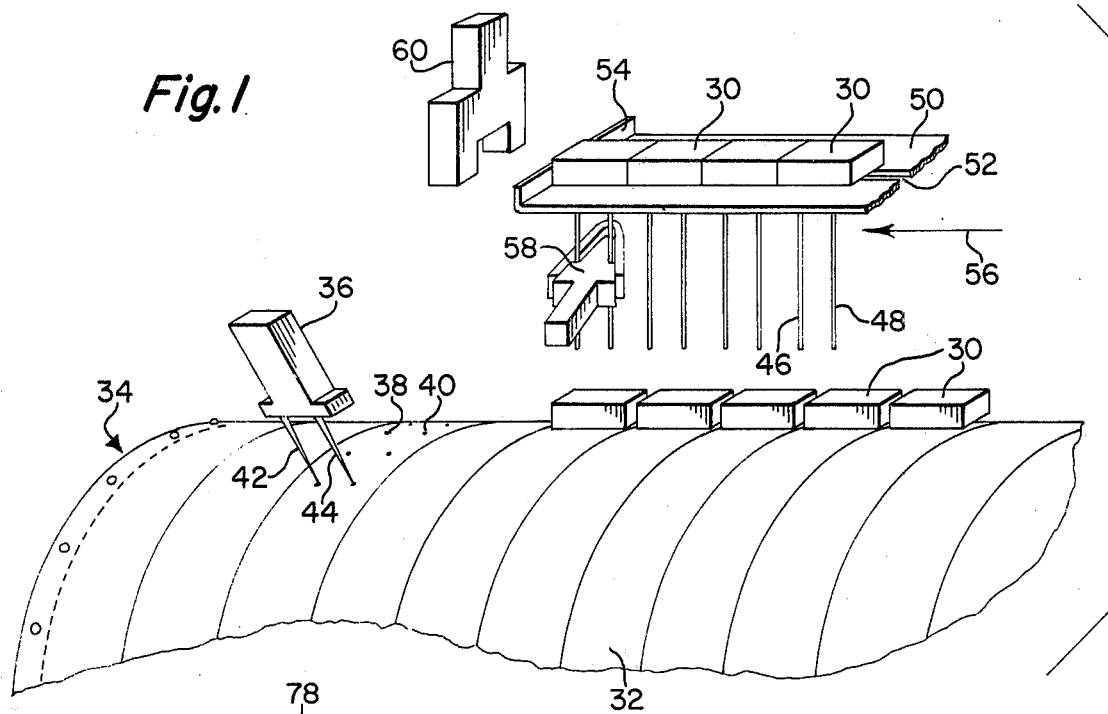
Fig.1
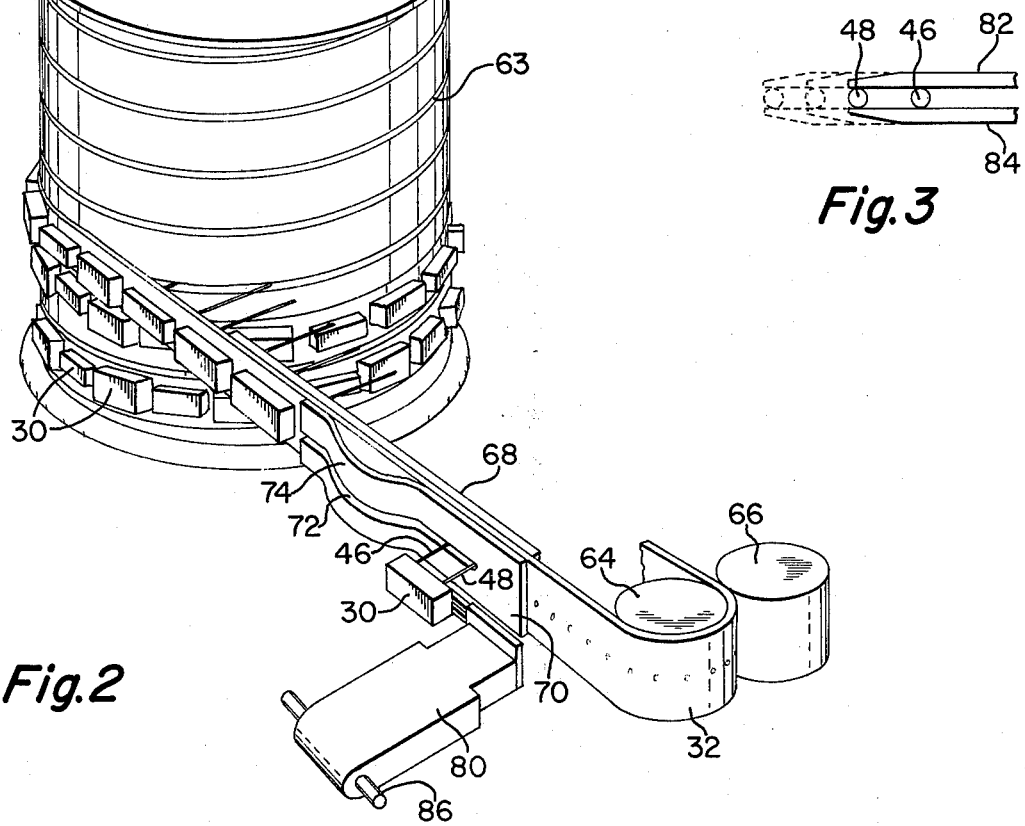
Fig.2
Fig.3

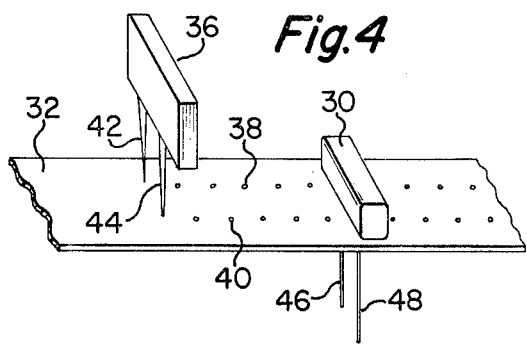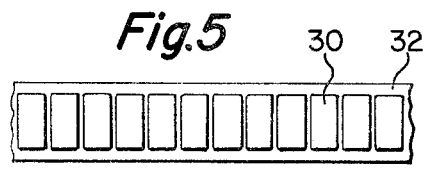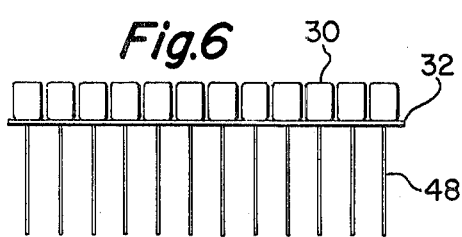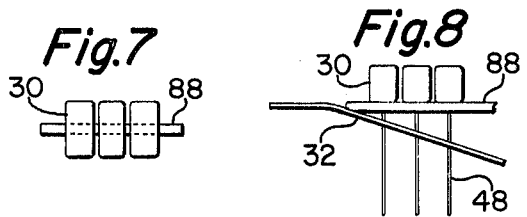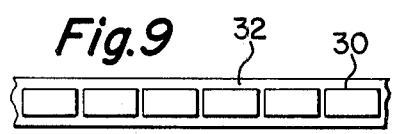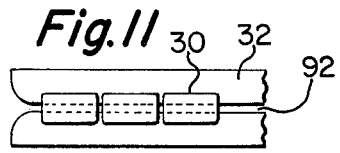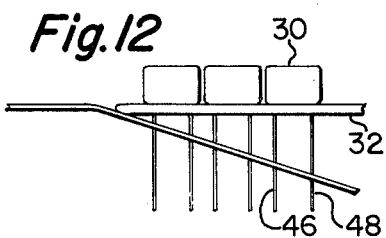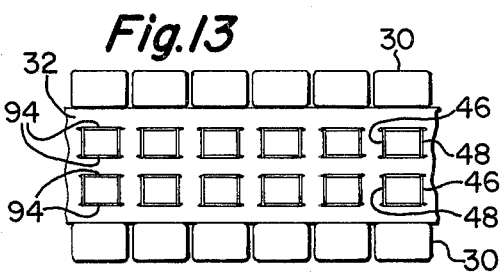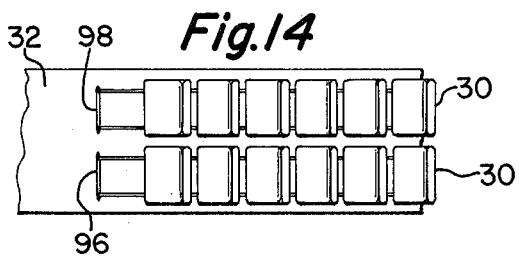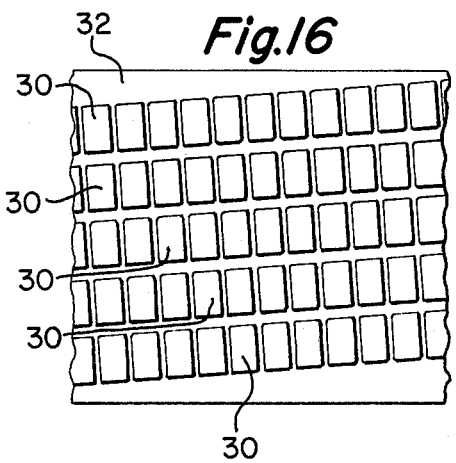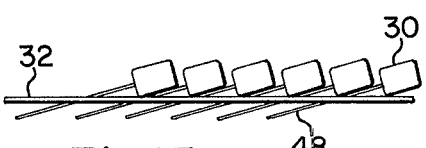

METHOD OF LOADING RADIAL LEAD COMPONENTS ON PLASTIC CARRIER

BACKGROUND OF THE INVENTION

Radial lead components are preferred for electrical circuit components used with printed circuit boards because they save a considerable amount of space and they give a better appearance to the circuit board and provide shorter circuit paths. Radial lead components are commonly processed for shipping with a pair of spaced-apart adhesive tapes attached to the leads of the component. The taped radial lead parts, after receipt by the user, are supplied to a station which cuts off the dual tape carrier, aligns the parts and inserts them into a printed circuit board. The present invention involves the use of a plastic carrier for radial lead components instead of the typical dual tape carrier.

A plastic carrier is preferable to the use of adhesive tape to hold radial lead components because:

1. A much smaller amount of material is required on the average to hold the components; and consequently, a cost saving that should be realized for most applications.
2. A plastic carrier will not contaminate the lead wire, whereas adhesive from paper adhesive tape may gum up the machinery and may also affect solderability of the leads.
3. A plastic carrier allows the lead to be removed from it, whereas the paper adhesive tape must be often thrown away.
4. Shorter lead wires may be used with a plastic carrier than with the adhesive tape system.
5. Electrical performance is not degraded by a plastic carrier, whereas the paper adhesive tape is hygroscopic and may thereby provide leakage paths. This means that electrical components may be checked while still mounted on the plastic carrier.
6. The leads will be retained by the plastic carrier on the exact centers as punched into the printed circuit board; and, thus, the plastic carrier may function as the gage for the spacing.
7. The printed circuit board must be interposed between the component body and the paper adhesive tape, and lead wires must be severed before the component can be threaded into the printed circuit board. It is possible to keep the plastic carrier interposed between the printed circuit board and the component with the proper choice of plastic or alternately the plastic carrier may be withdrawn through pre-cut slits after the component is assembled to the board.
8. With a plastic carrier it is possible to trim the carrier to the size of the printed circuit board with all the components inserted into place in the plastic carrier. The lead ends of the components need only project about one-eighth inch through the carrier; and with the plastic carrier rested properly on the printed circuit board, all the components may be simultaneously inserted into the board and since the leads are retained by the carrier lead, lead clinching may be avoided.
9. Paper adhesive tape varies greatly in quality, since it is a product of several processes and a producer; and delamination of paper adhesive tape is a serious problem as a result. With a plastic carrier, no such problem exists.
10. Precut lead wires may be utilized with a plastic carrier; and, therefore, the assembly machine does not need to incorporate the wire cutting mechanism.
11. Leads are protected from entanglement with one another once they are inserted on a plastic carrier.
12. The radial lead components are protected from being scarred by lead wires or packing material during shipment.
13. The radial lead components may be wound onto a large diameter core, very much like a rope, so that a large number of components may be conveniently stored on a single storage drum.

DESCRIPTION OF THE DRAWINGS

The present invention is shown by reference to the following drawings in which:

FIG. 1 shows apparatus for loading radial lead components onto a plastic carrier supported on a drum;

FIG. 2 shows a reusable drum reel which is loaded with components and which is associated with a mechanism for unloading the components from a carrier strip on the reel;

FIG. 3 shows a clamp removing the leads of the component from the carrier storage drum of FIG. 2;

FIG. 4 shows a plastic carrier strip with a punch for punching holes in a tape with a radial component inserted therein;

FIG. 5 is a top view of a loaded plastic carrier that corresponds to the arrangement of FIG. 1;

FIG. 6 is a side view of the loaded carrier of FIG. 5;

FIG. 7 is a top view of a wedge unloader for unloading the carrier of FIGS. 5 and 6;

FIG. 8 is a side view of the wedge unloader of FIG. 7;

FIG. 9 is a top view of a loaded carrier strip with the elongated dimension of the component being in the longitudinal direction of the strip;

FIG. 10 is a side view of the loaded carrier of FIG. 9;

FIG. 11 is a top view of a wedge unloader for unloading the carrier of FIGS. 9 and 10;

FIG. 12 is a side view of the wedge unloader of FIG. 11;

FIG. 13 is a loaded carrier with two rolls of components loaded onto the carrier with their leads being positioned parallel to the wide surface of the carrier and extending through slits in the carrier;

FIG. 14 is a loading configuration with two rows of components loaded onto a carrier so that they are held at an oblique angle;

FIG. 15 is a side view of the loaded carrier of FIG. 14;

FIG. 16 shows a plastic carrier that supports a plurality of rows of radial lead components;

TECHNICAL DESCRIPTION OF THE INVENTION

Figure 17:
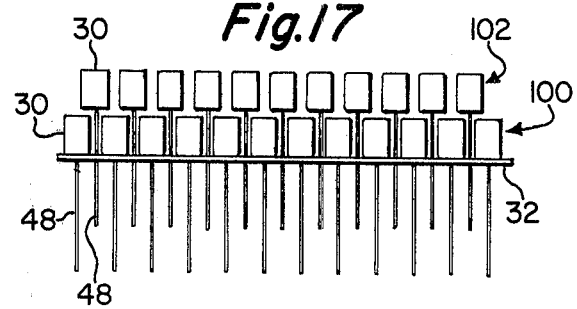
FIG. 17 illustrates a two tier loading configuration for radial lead components on a plastic carrier.
Figure 18:
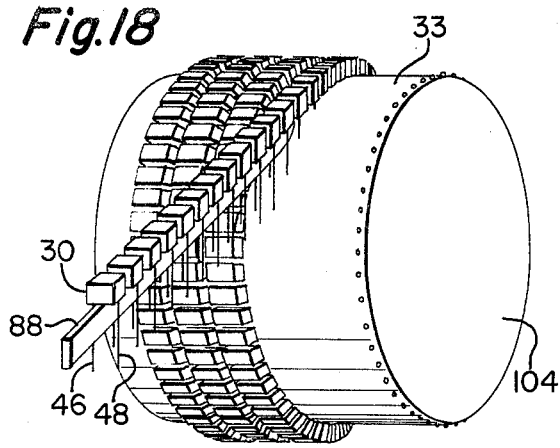
FIG. 18 shows a loaded plastic carrier being unrolled from a drum and being unloaded by means of the wedge unloader of FIGS. 7 and 8.
Figure 20:
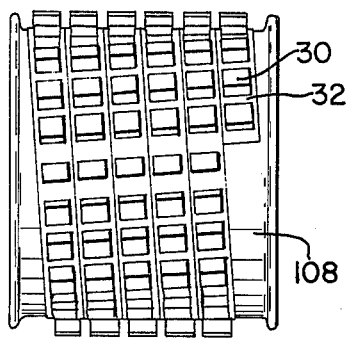
FIG. 20 shows a flat board which serves as a reel for a component loaded plastic carrier strip.

In FIG. 1 of the drawings, a plurality of radial lead components 30 are shown which are loaded onto plastic carrier strip 32 that is wound on a rotating drum 34. A punch 36 provides a pair of holes or slits 38, 40 for each component due to the punch legs 42, 44. The holes 38, 40 are preferably punched so that material is not removed. A feed member 50 having a groove 52 therein for receiving the leads 46, 48 of the components 30 is provided for holding the components 30. The feed member 50 moves in the direction of the arrow 56 so as to properly position the leads 46, 48 of the components 30 over corresponding holes 38, 40 punched in the carrier strip 32. The last component to be loaded is positioned against the end stop 54. A lead aligning mechanism 58 straightens the leads 46, 48 prior to their insertion in the holes 38, 40. The loading mechanism 60 removes the component 30 which is on the right hand side of the loading mechanism 50 from the groove 52 and inserts it into the appropriate holes 38, 40 as the drum 34 rotates. The components 30 are preferably loaded sequentially next to each other, as shown in FIG. 1; but the orientation of the components on the carrier may assure a number of different variations, as shown in the drawings.

Once the components are loaded onto the carrier strip 32, they may be loaded onto a disposable reel, such as the reel 62 of FIG. 2. In order to unload the components 30 from the reel 62, the carrier 32 is passed between an idler roller 64 and a drive roller 66 so that it passes between a guide plate 68 and a take-off plate 70. The take-off plate 70 has a groove 72 which guides the leads 46, 48 of the component 30. The take-off plate 70 has a short arcuate segment 74 which bends outwardly from the guide plate 68 to serve as a wedge in order to force the component 30 from the carrier 32. As the reel 62 rotates about the axis of the shaft 78, the components are continuously unloaded from the reel 62. A take-off mechanism 80, which has a pair of clamping jaws 82, 84 which engage the leads 46, 48 after the component passes the curved arcuate segment 74, thereby allowing the component 30 to be completely removed from the carrier 32 by the take-off mechanism 80 which is rotatable about the shaft 86. The reel 62 is preferably provided with a spiral groove 63 that receives the leads 46, 48 when the reel contains a loaded carrier strip 32. The clamping jaws 82, 83 are preferably adjustable to accommodate different width leads, and the jaws 82, 84 may be programmable so that they can slide back and forth to accommodate different lead spacings, as shown by the dotted line representation of FIG. 3. Once the component 30 is referenced for pick up by the take-off mechanism 80, it is preferable that the drive to the roller 66 be de-energized to remove the tension on the carrier 32 so as to keep the component in the reference position.

A carrier strip 32, along with a punching mechanism 36 and a single component 30 with its leads 46, 48 inserted into its associated holes 38, 40, is shown in FIG. 4. The top view of the loading configuration of FIG. 4 is shown in FIG. 5, and an end view of this loading configuration is shown in FIG. 6. The loading configuration of FIGS. 5 and 6 may be unloaded by a wedge unloader 88 which separates the components 30 and the carrier 32, as shown in FIGS. 7 and 8. In FIGS. 7 and 8, the elongated dimension of the components 30 is normal to the longitudinal axis of the carrier 32, and the wedge unloader is inserted intermediate the leads 46, 48.

FIG. 9 shows an alternate loading configuration in which the elongated dimension of the radial lead component 30 is aligned parallel to the longitudinal axis of the carrier 32. FIG. 10 is a side view of the loading scheme of FIG. 9. In order to unload the component 30 from the carrier strip 32 of FIGS. 9 and 10, a wedge unloader 90, which has a groove 92 in it to receive the leads 46, 48 in it, as shown in FIG. 11, may be employed. The loading configuration of FIGS. 9 and 10 is preferable to the loading configuration of FIGS. 5 and 6 in instances when the components 30 do not have equal lead width spacing.

In FIG. 13, an alternate loading configuration is shown in which the plastic carrier strip 32 is provided with a number of slits 94 which receive the leads 46, 48 on two rows of components 30 that are positioned so that their leads 46, 48 run parallel to the wide surface of the carrier strip 32. With the configuration of FIG. 13 the components 30 are more securely locked into place if the carrier is bent inwardly or toward the component 30. On the other hand, if the carrier 32 is curved outwardly or away from the components, they will be released and will fall out of the carrier 32.

FIG. 14 shows a still further loading configuration in which two rows of components 30 are positioned into a plastic carrier 32 that has two rows of slits 96, 98 which are in alignment with each other so that the components 30 may be positioned on the carrier 32 with a higher packing density. FIG. 15 is a side view of the loading configuration of FIG. 14 which shows that the components 30 are aligned on the carrier strip 32 at an oblique angle with respect to the wide face of the carrier strip 32.

A wide carrier 33 may also be employed, as shown in FIG. 16, so that a number of rows of components 30 may be positioned on the same carrier. FIG. 17 illustrates that the components 30 may be arranged into a two tier configuration whereby the lower tier 100 supports the upper tier 102 and the leads of all of the components project through holes in the carrier strip 32.

As an alternative to the loading of the narrow carrier strips 32, such as the strip 33 of FIG. 16, onto a disposable reel, such as the reel 62 of FIG. 2, the loaded drum 104 may be brought to an unloading location loaded with a wide carrier strip and the components 30 may then be reeled off the drum and unloaded by the wedge unloader 88 of FIGS. 7 and 8.

Figure 19:
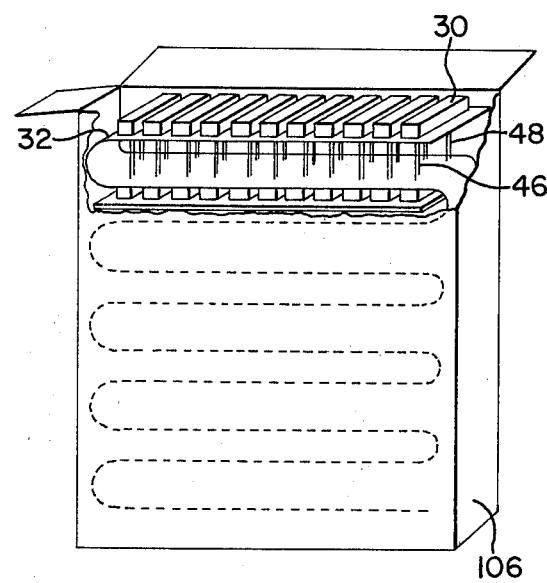
FIG. 19 shows a container which is loaded with radial lead components on a plastic carrier strip.

The carrier strips 32 may be stored in a conventional shipping carton 106 by folding a loaded carrier strip in overlapping layers in the manner shown in FIG. 19 so that one row of components has its leads pointing down and the next row has its leads pointing up and positioned adjacent to the leads of the first row of components. In some applications this may be a more desirable method of storing the loaded capacitor in transit then having them stored on a drum or a reel.

Another method of storing the components 30 and the carrier strip 32 would be to wind the strip 32 on a flat "dog bone" plate 108, such as that commonly used for the reeling of string or the like to conserve shipping and storage space compared with a reel or a drum.

The invention is claimed as follows:

1. A method of handling a plurality of radial lead components comprising moving a plastic carrier strip past a loading station, punching openings for the leads of said components in said carrier strip, sequentially loading said components onto said carrier strip at said loading station with said leads being forced into said openings, transporting said loaded carrier to a remote location, moving said loaded strip past an unloading station at said remote location, sequentially wedging each of said components away from said carrier strip at said unloading station, gripping said wedged-away component at said unloading station and pulling it free from said carrier strip.

2. A method as claimed in claim 1 wherein said components have an elongated dimension, and said carrier strip has a longitudinal axis which is parallel to the elongated dimension of said components and said wedging is achieved by a wedge having a groove in it which receives the leads of said components therein.

3. A method as claimed in claim 1 wherein said components have an elongated dimension, and said carrier strip has a longitudinal axis which is normal to the elongated dimension of said components and said wedging is achieved by a wedge which is inserted between the leads of said component.

4. A method as claimed in claim 1 wherein said carrier strip has a longitudinal axis and comprises two rows of slits that run parallel to the longitudinal axis of said carrier strip and the leads of one component are inserted into each of said slits with their leads parallel to the wide surface of said carrier strip.

5. A method as claimed in claim 1 wherein said components have an elongated dimension and said carrier strip has a longitudinal axis, said carrier strip comprises a plurality of rows of aligned slits that run normal to said longitudinal axis of said carrier strip and the leads of one component are inserted into each of said slits so that said components are aligned in pairs with their elongated dimension normal to the longitudinal axis of said carrier strip at an oblique angle with respect to the wide surface of said carrier strip.

6. A method as claimed in claim 1 wherein said components are loaded into a lower tier and an upper tier which is supported by said lower tier and the leads of both tiers of components pass through openings in said carrier strip.

7. A method as claimed in claim 1 wherein said loaded carrier strip is loaded into a shipping carton for transportation to said remote location by folding said loaded carrier strip into said carton in overlapping layers so that one row of components has its leads projecting in a first direction and the next row of components has its leads projecting in a second direction which is opposite to said first direction so that the leads of said second row of components are adjacent the leads of said first row of components in said shipping carton.

8. A method as claimed in claim 1 wherein said carrier strip is loaded onto a revolving storage member for transportation to said remote location.

9. A method as claimed in claim 1 wherein said carrier strip is loaded onto a flat plate member for transportation to said remote location.

10. A method as claimed in claim 1 wherein said carrier strip has a longitudinal axis and comprises a plurality of rows of slits that turn parallel to the longitudinal axis of said carrier strip and the leads of one component are inserted into each of said slits.

* * * * *